United States Patent [19]

Mennig et al.

[11] Patent Number: 5,716,424
[45] Date of Patent: Feb. 10, 1998

[54] METHOD OF PRODUCING GLASS SUBSTRATES WITH IMPROVED LONG-TERM RIGIDITY AT ELEVATED TEMPERATURES

[75] Inventors: Martin Mennig, Quierschied; Gerhard Jonschker, Elversberg; Helmut Schmidt, Saarbrucken-Gudingen, all of Germany

[73] Assignee: Institut fur Neue Materialien Gemeinnutzige GmbH, Saarbrucken, Germany

[21] Appl. No.: 338,516

[22] PCT Filed: Mar. 3, 1993

[86] PCT No.: PCT/EP93/00484

§ 371 Date: Dec. 9, 1994

§ 102(e) Date: Dec. 9, 1994

[87] PCT Pub. No.: WO93/24424

PCT Pub. Date: Dec. 2, 1993

[30] Foreign Application Priority Data

May 26, 1992 [DE] Germany .................. 42 17 432.5

[51] Int. Cl.$^6$ ............................................. C03C 17/00
[52] U.S. Cl. ................... 65/60.1; 65/17.2; 65/22; 65/29.14; 65/33.7; 65/37; 65/60.5; 65/60.51; 65/60.53; 65/60.8

[58] Field of Search .................. 428/426, 428; 65/60.5, 60.51, 60.53, 60.8, 60.1, 17.2, 22, 29.14, 33.7, 37

[56] References Cited

U.S. PATENT DOCUMENTS 2,474,061  6/1949  Moulton ........................... 88/1
4,596,745  6/1986  Chao .............................. 428/428

*Primary Examiner*—Nasser Ahmad
*Attorney, Agent, or Firm*—Oblon, Spivak, McClelland, Maier & Neustadt, P.C.

[57] ABSTRACT

Described is a process for the manufacture of glass substrates with improved long-term stability at raised temperatures, in which process a glass substrate is provided with a coating, this coating being prepared from a composition, which was obtained through hydrolysis and condensation of a compound that was dissolved in a solvent and belonged to at least one element from the group Si, Al, Ti and Zr and/or a suitable precondensate, optionally in combination with compounds, which are soluble in the reaction medium, of at least one element from the group of alkali metals, alkali earth metals, and boron. After the coating composition is deposited, the coating obtained thus is heat treated. The process is characterized in that the coating is not completely compacted.

15 Claims, No Drawings

METHOD OF PRODUCING GLASS SUBSTRATES WITH IMPROVED LONG-TERM RIGIDITY AT ELEVATED TEMPERATURES

BACKGROUND AND SUMMARY OF THE INVENTION

The present invention relates to a process for the manufacture of glass substrates with improved long term stability at raised temperatures, in particular a process, in which a glass substrate is provided with a coating, which exhibits a certain residual porosity and, therefore, experiences a volume contraction subject to the influence of high temperatures.

It is well-known that glass can be provided with a coating comprising Si-, Ti-, Zr-, Al-based materials, etc. in order to improve the different properties of the base glass. In principle, a covering layer is deposited on the base glass via a wet-chemical process (e.g. sol-gel process); and this layer is compacted into a film without pores by means of heating. It is also well-known that such coatings increase; e.g., the strength of the glass, especially when their coefficient of expansion is less than that of the base glass. In so doing, one can distinguish between two mechanisms. The one consists of reducing the number of defects on the glass surface and the other consists of forming compressive strains in the region near the surface when said layer is cooled following condensation owing to the layer's lower thermal coefficient of expansion. Since such compressive strains generally increase the strength of glass, it also affects the thermal stability, since the strains that occur at raised temperatures do not result in a break until there are higher stresses. One has had similar experiences with thermally or chemically hardened glasses; they, too, are characterized by a higher stability to thermal shock. Therefore, such glasses are used in fields, where they must resist a thermal stress, e.g. during fire proofing.

Whereas there already exist methods for improving the thermal shock property of glasses, no one has succeeded to date in providing glasses whose long-term stability at raised temperatures is satisfactory, thus, developed, for example, a glass pane that does not start to flow away when it is subjected to a raised temperature over a prolonged period of time. Especially glasses that are easy and inexpensive to manufacture (and are preferred, therefore, for most applications), such as sodium lime glasses, usually exhibit, on account of their chemical composition, a low glass transition temperature or a low viscosity at temperatures, to which this glass is subjected within the framework of a specific application. Even at comparatively mild temperatures, such glasses can present a problem with respect to softening and flowing away. Examples of glasses that can be subjected to high temperatures (optionally in combination with corrosive conditions) are furnace windows, fire proof glazing, optical glasses and chemical containers.

Thus, the present invention is based on the problem of providing a process, with which, starting from the most inexpensive base glass one can obtain in an inexpensive manner glass substrates with improved flow behavior, i.e. improved long-term stability at raised temperatures.

This problem is solved according to the invention by producing, not as in the case of the conventional process for improving the stability to thermal shock a compressive strain, but rather a tensile stress, with the aid of a coating on the surface of the glass substrate, and in particular during the heating up or heating period with the high temperature stress. This process takes place when layers, which have a tendency toward volume reduction subject to the effect of high temperatures owing to their thermomechanical or thermochemical properties and thus produce tensile stresses on the surface of the glass substrate, are deposited on the glass substrate. Such layers can be produced if a coating is produced by the conventional methods on the glass substrate, but said coating is not completely compacted. In other words, the coating still exhibits a certain residual porosity after its manufacture.

DETAILED DESCRIPTION

Correspondingly the invention provides a process for manufacturing glass substrates with improved long-term stability at raised temperatures, in which process (a) a coating composition—which was obtained through hydrolysis and condensation of at least one liquid compound and/or compound that is dissolved in a solvent and belongs to at least one element from the group Si, Al, Ti and Zr and/or a suitable precondensate, optionally in combination with compounds, which are soluble in the reaction medium, of at least one element from the group of alkali metals (e.g. Na, K, Li), alkali earth metals (e.g. Ca, Mg, Ba) and boron and optionally in the presence of a condensation catalyst—is deposited on the glass substrate; and b) the coating obtained thus is heat treated.

This process is characterized in that the coating is not completely compacted; i.e., it still exhibits a certain residual porosity (e.g. in the range of 1 to 10% by volume) at the end of the heat treatment. A very high percentage of this residual porosity comprises in the preferred embodiment in essence exclusively micropores with a pore size in the lower nm range ($\leq 20$ nm).

Preferably the coating composition is produced according to the sol/gel process.

Especially suitable for the above purpose are microporous layers. Such layers are, e.g., those with a relatively high $SiO_2$ content (e.g. at least 80 and in particular at least 90 mole % Si, based on the central atoms that are present altogether). Such layers have a high interface energy and can be compacted upon heating. However, a microporosity can also be produced by using, e.g. an alkyltrialkoxysilane compound as a starting compound for the coating composition. The alkyl group that cannot be hydrolyzed is then not present in the finished coating, but can be removed, e.g. thermally, thus leaving a "gap" (pore) behind. In addition, the use of such a compound (e.g. methyltriethoxysilane) makes the coating less brittle (increase in the plasticity) and is also preferred for this reason. Preferably more than 50, in particular more than 70 mole % of such starting compound are used. Even the addition of, e.g. silica sol, which process is described in detail below, can increase the porosity of the coating, even though in this case it does not involve (the preferred) microporosity.

Suitable base glasses for the glass substrates, which are to be coated according to the above process, are especially silicate glasses (e.g. window glass and bottle glass), lead silicate glasses, phosphate glasses, borate glasses, and rare earth glasses (La, Ce, Y and the like) with or without alkali and/or alkali earth components (e.g. Na, K, Ca, Ba). However, other glasses can also be coated according to the process of the invention, e.g. halogenide glasses (e.g. fluoride glasses) and chalcogenide glasses (e.g. sulfate glasses).

The glass substrate can be present in any arbitrary physical form, e.g. as boards, rods, tubes or fibers or as hollow bodies. In a special embodiment glass or ceramic fiber cloth is impregnated with the coating composition according to the invention, resulting in materials that are especially suitable for purposes of fire proofing.

According to the invention, $SiO_2$, $Al_2O_3$, $ZrO_2$, $TiO_2$, $SiO_2/TiO_2$, $SiO_2/ZrO_2$, $B_2O_3/SiO_2$, $Na_2O/B_2O_3/SiO_2$ and $Na_2O/Al_2O_3/B_2O_3/SiO_2$ compositions are preferred coating compositions. Especially preferred are $SiO_2$, $SiO_2/ZrO_2$ and $SiO_2/TiO_2$ coating compositions.

Suitable starting compounds for the coating composition are liquid compounds and/or compounds that dissolve in the reaction medium (solvent) and that belong to said elements, e.g. hydroxides, alkoxides, halogenides (fluorides, chlorides, bromides, iodides), acids, salts with organic or inorganic acids or bases and complex compounds or addition compounds.

Concrete examples for the above compounds are hydroxides, like $NaOH$, $KOH$, $Mg(OH)_2$, $Ca(OH)_2$ and $Al(OH)_3$; hydrolyzable alkoxides, like $NaOR$, $KOR$, $Mg(OR)_2$, $Ca(OR)_2$, $Ai(OR)_3$, $B(OR)_3$, $Si(OR)_4$, $RSi(OR)_3$, $R_2Si(OR)_2$, $Ti(OR)_4$ and $Zr(OR)_4$, where R is a straight chained or branched, substituted or non-substituted alkyl group having 1 to 6 (preferably 1 to 4) carbon atoms (e.g. methyl, ethyl, propyl or butyl); halogenides, like $NaCl$, $KBr$, $CaCl_2$, $SiCl_4$, $R'SiCl_3$, $R'_2SiCl_2$, $TiCl_4$ and $ZrCl_4$ (R'=alkoxy group derived from the above alkyl groups); acids, like boric acid; salts, like borates, nitrates, phosphates, carboxylates (e.g. formiates, acetates, citrates, tartrates, basic acetates and bonzoates) and phenolates; and complex compounds, like acetylacetonates and salicylates and addition compounds such as $Zr(NO_3)_4$ dioxan, THF, pyridine and the like.

Preferably one of the starting compounds is a compound of the general formula (I):

$$Si(OR)_4 \qquad (I)$$

where R is defined as above.

In another preferred embodiment of the present invention the starting compounds include not only those of the above formula (I) but also those of the general formula (II):

$$R^*Si(OR)_3 \qquad (II)$$

where R is defined as above and R, stands for R or aryl, in particular phenyl.

The starting compounds are dissolved preferably in water or an organic solvent or a mixture comprising water and an organic solvent that can be mixed with water (preferably an alcohol) and subjected to hydrolytic polycondensation. Organic solvents are with respect to the targeted improved coating properties preferred, whereby especially preferred are solvents that can be mixed at least partially with water. Examples of the suitable organic solvents are monovalent and polyvalent alcohols, like methanol, ethanol, n-propanol, isoprspanol, n-butanol, tert-butanol, ethylene glycol and glycerol; ethers, like dimethoxyethane, tetrahydrofuran, and ethylene glycol monomethyl ether; esters, like ethyl acetate and diethylene glycol acetate; ketones, like acetone and methyl ethyl ketone; hydrocarbons, like benzene and toluene; halogenated hydrocarbons, like carbon tetrachloride; and dimethyl formamide. Of the organic solvents, alcohols are preferred.

The hydrolysis and polycondensation can be conducted in one step in the presence of at least the stoichiometric amount of water required for complete hydrolysis of the existing hydrolyzable groups. As an alternative a precondensation in the presence of a small amount of water as the stoichiometric amount required for complete hydrolysis or of the existing hydrolyzable groups can be conducted; and then further condensation can be conducted with the addition of at least that amount of water that is needed to hydrolyze the remaining hydrolyzable groups.

The polycondensation may or may not be conducted in the presence of a condensation catalyst, e.g. a compound, which splits off protons or hydroxyl ions, or an amine. Specific examples are organic and inorganic acids, like hydrochloric acid, sulfuric acid, phosphoric acid, formic acid and acetic acid, as well as organic and inorganic bases, like ammonia, alkali and alkali earth metal hydroxides (e.g. $NaOH$, $KOH$ or $Ca(OH)_2$) and amides, which are soluble in the reaction medium, e.g. low alkyl amines and alkanol amines. Especially preferred are volatile acids and bases in particular hydrochloric acid, ammonia and triethylamine. The total catalyst concentration can range, e.g., up to 5 mole/liter.

The concentration of starting compound(s), based on the solvent, is adjusted in such a manner that a viscosity of the coating composition that is suitable for the subsequent coating operation is guaranteed.

The hydrolysis and partial precondensation is conducted usually at room temperature, but higher temperatures can also be applied, preferably up to the boiling point of the solvent that is used. The reaction conditions are adjusted in such a manner that the resulting coating solution has a viscosity of, e.g. 1 to 5 mPas, that is suitable for depositing a thin layer on the base glass.

The resulting coating solution (coating composition) is then deposited by the conventional method on the glass substrate to be treated, preferably by dipping, drawing or spraying. Especially preferred are dipping methods.

The amount of coating is chosen in such a manner that the layer thickness of the coating obtained following heat treatment ranges from 0.8 to 8 µm, preferably 1.5 to 3 µm, e.g. 2 µm.

Especially if layer thicknesses exceeding 2 µm are targeted, preferably a dispersion of, e.g., $SiO_2$, $TiO_2$, $Al_2O_3$ and/or $ZrO_2$ or the corresponding mixed oxides in water and/or another suitable solvent is added to the coating solution, or is included in the production process. The particle size of the added dispersions depends on the intended application, but ranges preferably from 4 to 20 nm.

Rheologically active additives can also be added in the customary amounts to the coating solution. Examples of such additives are cellulose derivatives, like methyl cellulose and hydroxypropyl cellulose, ethylene glycol, glycerol, polyethylene glycol, polyvinyl acetate, polyvinyl alcohol and the like.

During the glass production, the coating can be applied directly on the still hot base glass from the finishing process, e.g. by means of aerosol coating. In this case, a separate drying and heat treatment step is superfluous. On the other hand, e.g. during the coating operation of a glass substrate, which is supposed to be coated subsequently, the coating is dried at normal pressure or reduced pressure and a temperature around the boiling point of the solvent used, e.g. 10 minutes at 110° C.

In the subsequent process step, the coating is heat treated at a temperature below the softening point of the base glass, preferably below 550° C., in such a manner that the coating is not completely compacted. The treatment temperature is chosen in such a manner that the shape does not change. For flat glass (window glass) this means, e.g., that the temperature should not exceed 500° C.

If the glass substrate produced in this manner is subjected at the site of application, e.g., as furnace windows or fire proof glazing, to high temperatures, the result is a volume contraction, as described above, during the heating up period owing to the existing residual porosity; and a tensile stress is produced in the coating, which is responsible for the targeted improvement in the flow behavior.

The following examples serve to further explain the invention, without restricting it.

EXAMPLE 1

| Preparation of a SiO$_2$ sol Required chemicals: | |
|---|---|
| 20 ml | methyltriethoxysilane |
| 6 ml | tetraethoxysilane |
| 6 ml | water |
| 6 ml | propanol |
| 0.02 ml | HCl (conc.) |

The alkoxysilanes are mixed while stirring; and 3 ml of propanol are added. Water, the remaining 3 ml of propanol and the concentrated hydrochloric acid are mixed and left to merge slowly while stirring. After 20 minutes the sol is cooled to room temperature and is filtered through a 0.2 µm injection filter.

Window glass is coated with the aid of an immersion coating apparatus (speed of draw 1–8 mm/s). The freshly drawn layers are dried at 60° C. for 15 minutes and subsequently compacted (incompletely) in a furnace according to the following temperature program:

room temperature to 400° C. with 1K/min

400° C. to 500° C. with 0.3K/min.

These temperature conditions were not sufficient to compact completely the coating. Rather many small micropores which were not visible to the naked eye remained in the coating. The thickness of the finished coating was approx. 1.5 µm.

EXAMPLE 2

| Preparation of a sol containing TiO$_2$ Required chemicals: | |
|---|---|
| 16.8 ml | methyltriethoxysilane |
| 2.3 ml | tetraethoxysilane |
| 8 ml | water |
| 4 ml | titanium(IV)isopropylate |
| 21 ml | ethanol |
| 0.04 ml | HCl (conc.) |

The alkoxysilanes are mixed; and 2 ml of ethanol, 0.04 ml of HCl, and 1 ml of water are added. After 5 minutes of vigorous stirring, 4 ml of titanium(IV)isopropylate are added and the mixture is stirred for a few more minutes. Then, 7 ml of water and 19 ml of ethanol are added; and the resulting mixture is filtered after 20 minutes through an 0.8 µm injection filter.

Window glass is coated with the aid of an immersion coating apparatus (speed of draw 1–6 mm/s). The freshly drawn layers are dried at 60° C. for 15 minutes and subsequently compacted in a furnace according to the following temperature program:

room temperature to 400° C. with 1K/min

400° C. to 500° C. with 0.3K/min.

The thickness of the finished coating ranged from 1–1.5 µm.

EXAMPLE 3

| Preparation of a coating sol containing silica sol Required chemicals: | |
|---|---|
| 20 ml | methyltriethoxysilane |
| 6 ml | tetraethoxysilane |
| 15 g | of Bayer silica sol type 300, 30% by wt. (concentrated to 45% by wt.) |
| 0.3 ml | HCl (conc.) |
| 5 ml | propanol |

The silanes are introduced and the silica sol is added with vigorous stirring. After an emulsion has formed (approx. 20 sec.), the hydrochloric acid is added in order to start the hydrolysis. The mixture remains cloudy for 20–60 seconds and then suddenly becomes first viscous, then liquid and then clear. During this reaction, the sol heats up to approx. 40° C. After cooling to room temperature, the mixture is filtered through an 0.8 µm filter with 5 µm prefilter. The sol produced thus can be adjusted with ethanol to a desired viscosity and is available for coating for at least 6 hours.

Window glass is coated with the aid of an immersion coating apparatus with speeds of draw ranging from 3–10 mm/s. The freshly drawn layers are dried at 60° C. for 15 minutes and subsequently compacted in a furnace according to the following temperature program:

room temperature to 400° C. with 1K/min

400° C. to 500° C. with 0.3K/min.

The thickness of the finished coating ranged from 2–6.5 µm.

EXAMPLE 4

| Preparation of a coating sol containing zirconium oxide Required chemicals: | |
|---|---|
| 19.2 ml | methyltriethoxysilane |
| 2.6 ml | tetraethoxysilane |
| 5.1 ml | of H$_2$O |
| 2.7 ml | of zirconium(IV)butylate (80% in n-butanol) |
| 10.0 ml | propanol |
| 0.05 ml | HCl (conc.) |

The silanes are introduced and prehydrolyzed with hydrochloric acid and 1 ml of water for 5 minutes. To homogenize the solution, another 3 ml of propanol are added. After 5 minutes have elapsed, a mixture comprising 3 ml of propanol and 2.7 ml of zirconium(IV) butylate is added to the prehydrolysate while stirring vigorously. After one minute, the remaining water (4.1 ml), mixed with 4 ml of propanol, can be added. After the solution has been cooled to room temperature and filtered through an 0.8 µm filter, it can be used for coating for at least 8 hours.

Window glass is coated with the aid of an immersion coating apparatus with speeds of draw ranging from 1–6 mm/s. The freshly drawn layers are dried at 60° C. for 15 minutes and subsequently compacted in a furnace according to the following temperature program:

room temperature to 400° C. with 1K/min

400° C. to 500° C. with 0.3K/min.

The thickness of the finished coating ranged from 1–1.5 µm.

EXAMPLE 5

Preparation of an Impregnated Glass Fiber Cloth 200 ml of methyltriethoxysilane, 60 ml of tetraethoxysilane and 71 ml of 30% silica sol (Bayer silica sol type 300) are stirred vigorously; and 1.8 ml of concentrated hydrochloric acid is added. After 10 minutes the solution is diluted with 50 ml of ethanol.

Coating Process 1

The sol is filled into a polyethylene immersion tank. A glass fiber fabric (30×60 cm) from commercially available E glass having a weight of 400 m²/g is dipped into the solution and pulled out after 1 minute of dwell time at a speed of draw of 6 mm/s. Subsequently the fabric is oven dried for 20 minutes at 100° C.

Coating Process 2

The sol is further diluted with 100 ml of ethanol and sprayed with a compressed air atomizer on both sides of the free hanging glass fiber cloth until the fabric is saturated. Then the fabric is dried with a hot air blower at approx. 100° C. of hot air.

After this treatment the glass fiber cloth resists the effect of 2 butane gas burners (Tmax: 1,750° C.). To quantify the reinforcing effect a 10×5 cm piece of cloth is examined in a measuring apparatus, which records the elongation of the cloth under temperature stress. In so doing, the uncoated fabric exhibited a softening point of approx. 840° C., whereas the coated test sample did not tear until approx. 1,050° C.

We claim:

1. A process for the manufacture of a coated glass substrate, comprising the steps of:
   (i) preparing a coating composition by hydrolyzing and condensing:
      (a) at least one compound of formula (I):

  (I)

wherein R stands for a $C_{1-6}$ alkyl group; and
      (b) at least one compound of formula (II):

  (II)

wherein R is as defined above and R* represents R or a $C_{6-14}$ aryl group; and, optionally,
      (c) at least one other compound of an element selected from the group consisting of Si, Al, Ti and Zr; and/or
      (d) suitable precondensates of said compounds (a) to (c); or a combination of said compounds (a) to (c) with said precondensate;
      said compounds (a) to (c) and said precondensates (d) being either liquids or being dissolved in a solvent or both; optionally in combination with at least one compound of an element selected from the group consisting of alkali metals, alkaline earth metals and boron, said at least one compound being soluble in the reaction medium; and optionally in the presence of a condensation catalyst;
   (ii) applying said coating composition of step (i) onto a glass substrate; and
   (iii) heat treating the coated glass substrate of step (ii) so as to not completely compact the coating, thereby preparing a coated glass substrate of improved long-term stability at elevated temperatures.

2. The process of claim 1, wherein the coating composition is produced by the sol/gel process.

3. The process of claim 1, wherein said glass substrate is a silicate glass, lead silicate glass, phosphate glass, borate glass or a rare earth glass with or without alkali, alkaline earth or mixed alkali-alkaline earth components.

4. The process of claim 1, wherein the coating composition further is based upon a starting compound containing aluminum, titanium or zirconium.

5. The process as claimed in claim 1, wherein the solvent is water or a water-alcohol mixture.

6. The process of claim 1, wherein the hydrolysis and precondensation are conducted in the presence of an acidic or basic condensation catalyst.

7. The process as claimed in claim 1, wherein a dispersion of $SiO_2$, $TiO_2$, $Al_2O_3$, $ZrO_2$ or a mixed combination of oxides in water, an organic solvent or a combination thereof is added to the coating composition before, during, after or a combination thereof the preparation of the same.

8. The process as claimed in claim 1, wherein the coating composition is applied by dipping, drawing or spraying.

9. The process as claimed in claim 1, wherein the coating is heat treated at a temperature below the softening point of the base glass.

10. The process as claimed in claim 9, wherein said temperature of heat treatment is below 550° C.

11. The process as claimed in claim 1, wherein the heat treated coating exhibits a thickness ranging from 0.8 to 8 μm.

12. The process as claimed in claim 11, wherein said thickness ranges from 1.5 to 3 μm.

13. The process as claimed in claim 1, wherein R is a $C_{1-4}$ alkyl group, and R* is phenyl.

14. A glass substrate which exhibits improved long-term stability at elevated temperatures prepared by the process of claim 1.

15. A furnace window, fire proof glazing, fire proof fire mat, optical glass or chemical container formed of the glass substrate of claim 14.

* * * * *